United States Patent [19]

Siebol

[11] 4,137,817
[45] Feb. 6, 1979

[54] BLIND RIVET WITH RECESSED EXPANDING HEAD

[75] Inventor: George Siebol, Orange, Calif.
[73] Assignee: Olympic Fastening Systems, Inc., Downey, Calif.
[21] Appl. No.: 691,875
[22] Filed: Jun. 1, 1976

Related U.S. Application Data

[63] Continuation of Ser. No. 244,408, Apr. 17, 1972, abandoned, which is a continuation-in-part of Ser. No. 879,201, Nov. 24, 1969, Pat. No. 3,657,957.

[51] Int. Cl.² .............................................. F16B 19/10
[52] U.S. Cl. .................................................... 85/78
[58] Field of Search ...................................... 85/77, 78

[56] References Cited

U.S. PATENT DOCUMENTS 3,377,908 4/1968 Stav et al. ................................ 85/78

FOREIGN PATENT DOCUMENTS 724509 1/1932 France .......................................... 85/77

Primary Examiner—Marion Parsons, Jr.
Attorney, Agent, or Firm—Fulwider, Patton, Rieber, Lee & Utecht

[57] ABSTRACT

A blind rivet comprising a sleeve with a preformed rivet head at one end, and a setting pin telescoped into the sleeve and having a pulling section projecting beyond the headed end of the sleeve and an expanding head projecting beyond the other end of the sleeve, to be pulled into the sleeve from the headed end thereof to expand the other end of the sleeve into a bulb-shaped rivet head against one side of two workpieces that are to be riveted together, the pulling section being broken off after the rivet is set, in response to engagement of the expanding head with stop means in the sleeve. The expanding head has an expanding shoulder for initiating expansion of the sleeve, and a taper beyond this shoulder which progressively increases the diameter of the head toward its free end. The setting pin is composed of material of relatively high hardness for optimum strength in the completed joint, and the larger end portion of the taper is structurally weakened by a recess extending into the free end of the head; but stopping short of the expanding shoulder and the portion of the head that extends across the shear plane of the completed joint, so that the full strength of the material is available in the shear plane and the strength in the taper is substantially reduced. The weakening recess enhances the ability of the expanding head to form an optimum blind side rivet head in workpieces of varying grip length.

10 Claims, 8 Drawing Figures

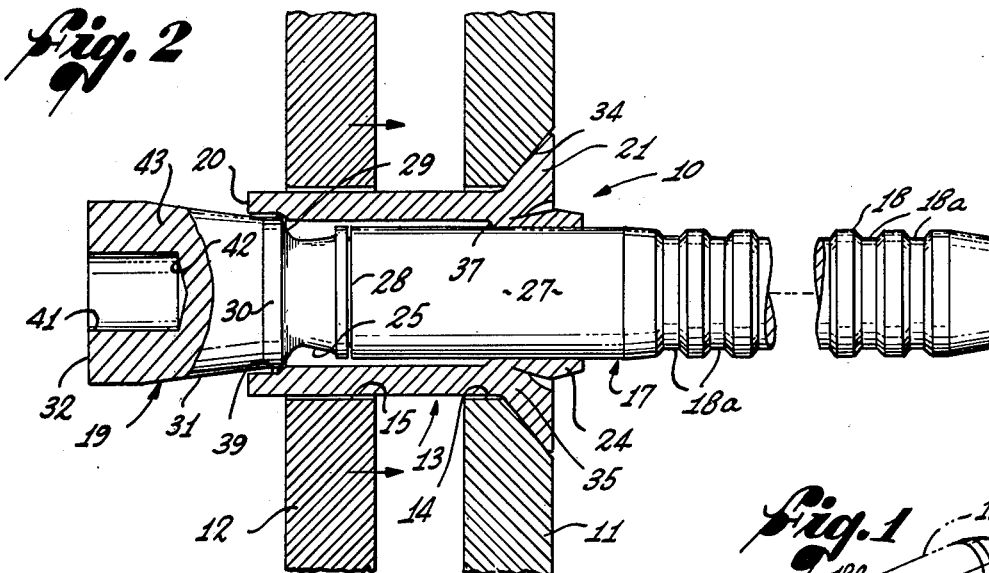
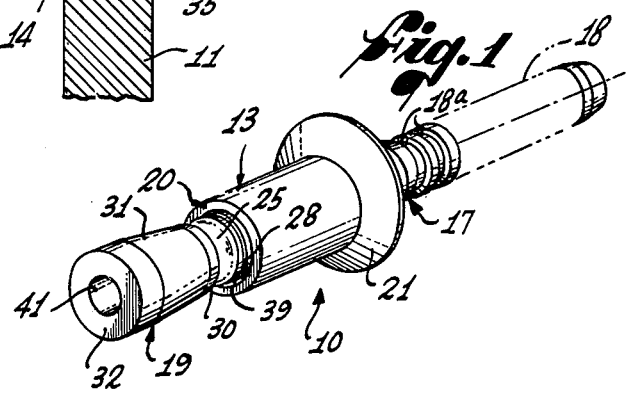
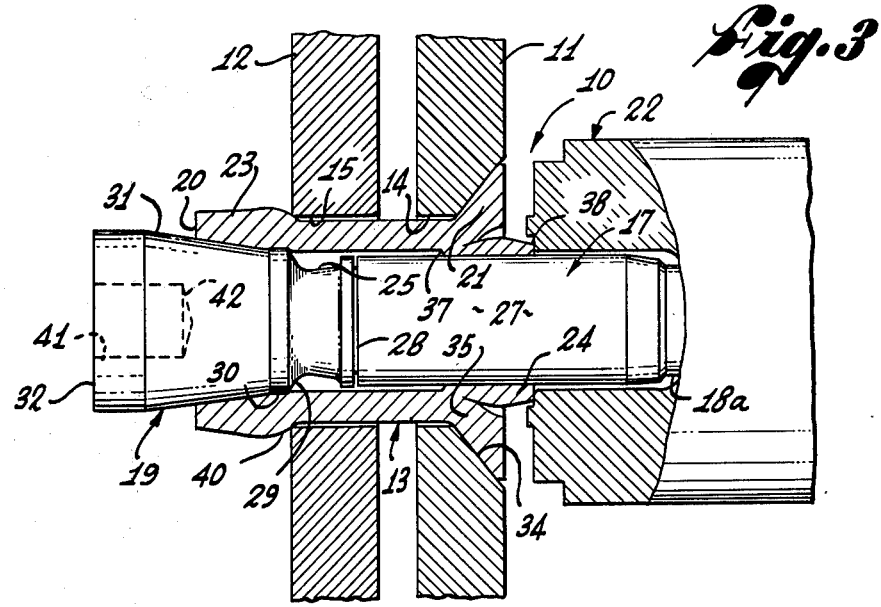

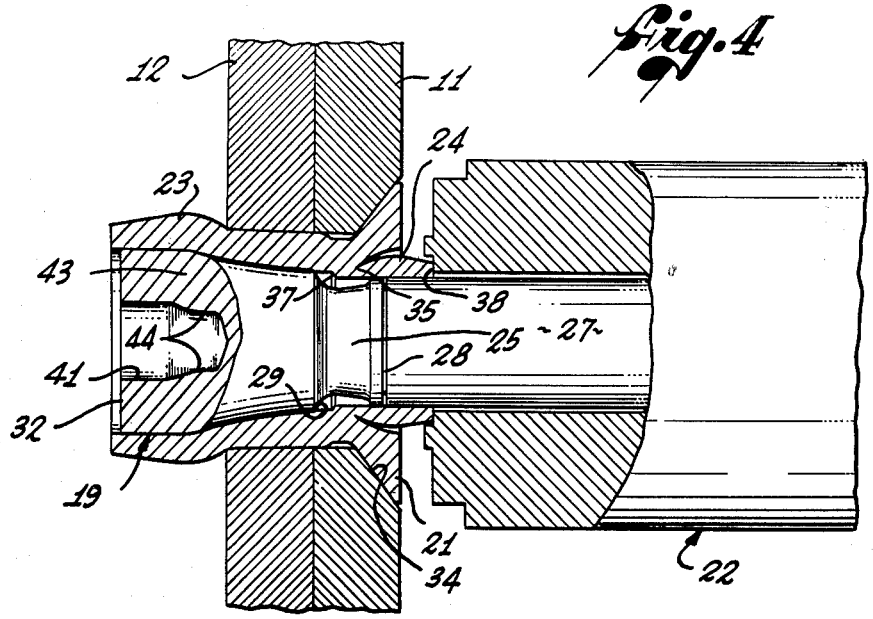
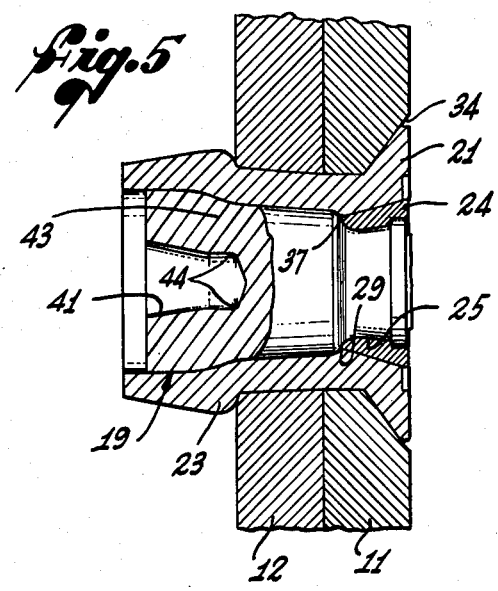
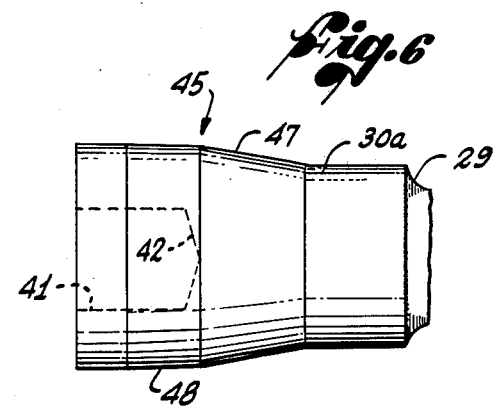
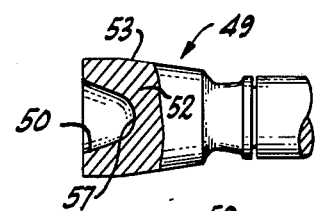
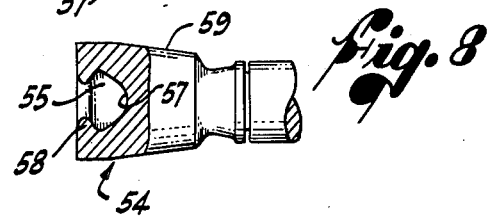

BLIND RIVET WITH RECESSED EXPANDING HEAD

CROSS-REFERENCE TO RELATED APPLICATION

This is a continuation of my copending application Ser. No. 244,408, filed Apr. 17, 1972, entitled "Blind Rivet With Recessed Expanding Head," now abandoned, which was a continuation-in-part of Ser. No. 879,201, filed Nov. 24, 1969 now U.S. Pat. No. 3,657,957.

BACKGROUND OF INVENTION

The present invention relates to rivets and, more particularly, to a so-called blind rivet especially adapted for the riveting of side-by-side workpieces where access is convenient from only one side of the workpieces. The side of the work from which the rivet is applied is referred to as the front or "access" side and will be so referred to herein. The other side is called the rear or "blind" side.

A blind rivet of the general type to which the present invention relates is described in U.S. Pat. No. 3,285,121 wherein it will be seen that a headed sleeve is telescoped over, and positioned on, an elongated and specially formed setting pin having a pulling section projecting beyond the headed end of the sleeve and an expanding and locking head projecting beyond the opposite end of the sleeve. This head has an expanding shoulder adjacent the end of the sleeve and a taper which progressively increases the size of the head beyond the expanding shoulder.

With its two basic parts in telescoped relation, the rivet customarily is inserted into aligned holes in two workpieces that are to be riveted, from the access side thereof, and is positioned with the head of the sleeve adjacent this side of the work and with the expanding head of the setting pin on the blind side. Then the pin is pulled from the access side while the sleeve is held against movement. This draws the expanding head into the blind-side end of the sleeve to clinch the workpieces together, expands the sleeve to fill the holes in the workpieces, and form a bulged, bulb-shaped head on the blind-side end of the sleeve.

As the setting operation is completed, a locking crown disposed around the setting pin within the sleeve head on the access side is swagged into a locking groove in the pin, and the pulling section of the pin is broken off substantially flush with the sleeve head. In this manner, the workpieces are clinched together and are held between the two heads on the opposite ends of the sleeve.

The tightness and fatigue life of each joint depend upon both the tensile and shear strengths of the rivet and the amount of bearing area that can be developed between the expanded, blind-side head of the blind-side workpiece without splitting or tearing the latter. Tensile and shear strengths, of course, depend primarily upon the strength of the materials used in the rivet, and increase as the hardness of the materials is increased. On the other hand, the amount of blind-side bearing area that can be developed depends upon the deformability of the sleeve, and the ductility of the expanding head, that is, the ability of the expanding head to wire-draw during the setting operation. This wire-drawing ability is particularly important to accommodate variations in the overall thickness of the work, or grip lenght, within permissible tolerances, and to avoid danger of splitting or tearing of the blind-side end of the sleeve or the blind-side workpiece, which sometimes has relatively low bearing strength.

The aforesaid patent discloses a rivet in which the material used represents a compromise between high strength and high ductility. The aforesaid application discloses an improved rivet in which the expanding head is formed with a central core of high strength and has a softer, more ductile peripheral layer of annealed metal which is readily deformable during setting of the rivet. Thus, the core imparts high strength, while the peripheral layer provides the desired ductility.

While it is possible to obtain such improved strength and head-forming characteristics by peripherally annealing the head of the setting pin, a need also has existed for a rivet with similar characteristics obtained without peripheral annealing, either because such annealing is impractical with certain materials, or because of the added manufacturing expense involved in the annealing operation. For example, it is desirable to use aluminum rivets in aircraft structures because aluminum is relatively strong and light in weight, but aluminum does not respond to annealing as rapidly as steel, and thus is difficult to anneal in the manner described in the aforesaid patent.

SUMMARY OF THE INVENTION

Accordingly, a primary objective of the present invention is to provide a blind rivet of the foregoing general character in which the optimum hardness of a given material may be used for the setting pin to provide high strength in the completed joint, and in which the formation of the blind-side head may be accomplished with virtually the same effectiveness as with a peripherally annealed expanding head, but without need for a peripheral annealing operation. For these purposes, a weakening recess is formed in the free end of the head to extend into the larger end portion of the taper and to reduce the cross-sectional thickness of the head sufficiently to permit controlled collapsing of the head during setting of the rivet. The weakening recess terminates short of the expanding shoulder and of the shear plane of the completed joint, so that the full cross-sectional thickness of the setting pin is disposed in the shear plane for relatively high shear strength in the completed joint. Thus, the hardness of the setting pin may be higher than would be satisfactory for the expanding head, which is structurally weakened by the recess to deform as needed during the setting operation.

The weakening recess preferably is cylindrical in initial shape, but may be tapered inwardly to a rounded end, and also may have an inturned, reinforcing flange around its outer end. The taper of the expanding head typically is conical and constant, but alternatively may have a leading section of relatively steep taper and a trailing section of lesser taper, to enhance its bulge-forming capability.

Other aspects and advantages of the invention will be apparent from the following detailed description, taken in conjunction with the accompanying drawings.

BRIEF DESCRIPTION OF THE DRAWINGS

FIG. 1 is a perspective view of a blind rivet embodying the novel features of the present invention;

FIG. 2 is an enlarged view showing the rivet of FIG. 1 inserted in two workpieces prior to setting of the rivet, with the workpieces and the sleeve shown in cross-section, part of the expanding head broken away and shown in cross-section, and part of the pulling section of the setting pin broken away for compactness;

FIG. 3 is a view similar to part of FIG. 2, showing the rivet in the process of being set by a tool head gripping the pulling section of the setting pin, the workpieces being in the process of being clinched together;

FIG. 4 is a view similar to FIG. 3 showing the continued setting of the rivet after the workpieces have been clinched together;

FIG. 5 is a view similar to FIGS. 3 and 4 showing the completed joint after the pulling section has been separated from the remainder of the setting pin;

FIG. 6 is an enlarged fragmentary side elevational view of a modified configuration of the expanding head;

FIG. 7 is a similar view on a smaller scale showing a second modified configuration; and FIG. 8 is a view similar to FIG. 7 showing a third modified configuration.

DETAILED DESCRIPTION

As shown in the drawings for purposes of illustration, the invention is embodied in a blind rivet, indicated generally by the reference number 10, for joining together two workpieces, such as flat plates 11 and 12, when access is convenient from only one side of the work, the right side as viewed in FIGS. 2 through 5. In general, this type of rivet comprises two main parts, a tubular sleeve 13 sized to fit freely through two aligned holes 14 and 15 in the plates, and a setting pin 17 extending through the sleeve and positioned therein with one end portion 18 of the pin projecting through and beyond the right end of the sleeve, and with an expanding and locking head 19 on the opposite end of the pin, spaced beyond the left end 20 of the sleeve. The sleeve has a preformed head 21 on its right end, so that the rivet 10 may be inserted into the holes 14 and 15 from the access side and positioned in the plates with the sleeve head 21 against the right plate and the expanding head 19 projecting to the left beyond the left plate. With the parts in this condition, the setting pin is pulled to the right by a suitable tool head 22 while the sleeve and the right plate are restrained against movement, thus drawing the expanding head into the blind-side end of the sleeve to a bulb-shaped head 23 on the sleeve on the blind-side of the work. To complete the joint, a locking crown 24 integral with the sleeve head 21 is pressed into an annular locking groove 25 in the setting pin, and the pin is snapped off substantially flush with the access side of the joint.

More specifically, the illustrative setting pin 17 comprises a central section 27 disposed primarily within the sleeve 13 and having an outside diameter fitting loosely therein, a right end section 18 formed with a series of closely spaced peripheral grooves 18a facilitating gripping of the pin by the tool head 22, and a weakening "breakneck" groove 28 around the central section adjacent the locking groove 25 for determining the eventual break-off plane of the pin. The locking groove separates the central section from the expanding head 19, the right end of which is formed by the left sidewall of the groove. The outer portion 29 of this sidewall extends radially outwardly beyond the outside diameter of the central section 27 and forms an expanding shoulder, which preferably is harder than the remainder of the expanding head.

Beyond the shoulder 29 is a relatively short cylindrical portion 30 which, with the shoulder, makes up the expansion section of the head. The axial length of this section varies according to the thickness of the workpieces for which the rivet is designed, and may be limited to the axial length of the shoulder alone, as illustrated in FIGS. 7 and 8, or may be substantially longer, as illustrated at 30a in FIG. 6. The form shown in FIGS. 1 and 2 has an expanding section of intermediate length.

Formation of the blind-side head 23 on the sleeve 13 during setting of the rivet 10 is accomplished primarily by a conical taper 31 on the head, which increases the size of the head progressively from the expansion section thereof toward the free, blind-side end 32. The taper may be formed at various angles, (for example, six degrees) and typically has a constant slope from the expansion section to a cylindrical free and end portion 33, as shown in FIGS. 1, 2, 7 and 8.

Herein, the head 21 on the access-side end of the sleeve 13 is frustro-conical in shape and is fitted into a countersunk recess 34 in the access side of the plate 11 so as to be substantially flush with the access side of the work. The locking crown 24 is partially sheared out of the central portion of the head 21 and remains integrally joined thereto at 35 around the interior of the sleeve. The inside diameter of the sleeve is reduced inside the head 21 to form an annular internal stop shoulder 37 facing toward the left and opposing the expanding shoulder 29 to abut against the latter and stop rightward movement of the expanding head 19 as setting of the rivet is completed, thereby assisting the tool head 22 in snapping off the pulling section 18 at the breakneck groove 28.

Preparatory to the setting operation, the pulling section 18 is gripped between a plurality of jaws (not shown) in the tool head 22, and the end 38 of the tool head is pressed against the locking crown 24 to seat the sleeve head 21 firmly in the countersunk recess 34. Then the setting pin 17 is pulled to the right while the sleeve 13 is restrained by the tool head against movement to the right, thus drawing the expanding head 19 into the blind end of the sleeve, which may be counterbored or internally relieved at 39 to facilitate the initial expansion of the blind end of the sleeve. The expanding shoulder 29 preferably is positioned in the counterbore adjacent the inner end thereof as the setting operation begins.

As the shoulder 29 passes the end of the counterbore 39 and moves along the sleeve 13, an expansion wave 40 (FIG. 3) is set up in the sleeve and progresses along the sleeve with the shoulder. Upon engagement of this wave with the blind-side plate 12, it shifts the plate to the right and cooperates with the tool head 22 in clinching the plates tightly together.

Then, when further movement of the blind-side plate 12 is prevented by the access-side plate 11, the expanding shoulder 29 is pulled into the portion of the sleeve within the plates (FIGS. 4 and 5), and expands the sleeve to fill the holes 14 and 15. The shoulder continues through the sleeve and across the shear plane of the joint (the plane between the two plates) until it abuts against the stop shoulder 37.

As the expansion shoulder 29 is moving through the sleeve 13, the taper 31 of the expanding head 19 follows the expansion wave into the blind-side end of the sleeve and further expands the sleeve to begin forming the blind-side head 23 thereon. As shown in FIG. 3, the entry of the taper into the sleeve forces the latter toward the blind-side plate 15 and begins to produce a pronounced bulge against the plate. Such bulging increases as the larger end portion of the taper enters the sleeve (FIG. 4), and is accompanied by yielding deformation of the taper, as illustrated in FIGS. 4 and 5.

As previously suggested, such deformation enables the setting pin 17 to accommodate variations in grip length without splitting the sleeve or the blind-side workpiece, and it therefore is highly desirable to provide a relatively soft and ductile expanding head for yielding during the setting operation. On the other hand, the overall strength of the completed joint depends upon the strength of the material of the rivet 10, and thus increases with the hardness of the material. Accordingly, the practice in the past has been either to compromise in selecting the hardness of the material to be used, or to provide an annealed peripheral layer in the manner described in the aforesaid application.

In accordance with the present invention, the setting pin 17 is composed of material having optimum hardness for the desired strength that can be obtained with a given material, and the larger portion of the taper 31 is structurally weakened sufficiently to obtain the desired deformability of the expanding head 19 for formation of the blind-side sleeve head 23, thereby satisfying both requirements without need for peripheral annealing or the like. Such structural weakening is achieved by means of a recess 41 which extends into the expanding head from the free end thereof, and into the taper, but terminates short of the expanding shoulder 29 and the adjacent portion of the head which will extend across the shear plane in the completed joint. Accordingly, the rivet 10 forms a joint of high overall strength, and also is capable of deforming to a relatively high degree in the area of the taper to form the blind-side head with high bearing area against the blind-side plate, while accommodating variations in grip length.

As shown in FIGS. 1 through 3, the weakening recess 41 may be simply a cylindrical indentation in the free end of the head, of a type that can be formed as an incident to the formation of the head in a header. The diameter of the recess is shown as somewhat less than one-half the diameter of the head, and the depth of the recess is such that the inner end 42 thereof is spaced a substantial distance to the left of the expanding shoulder 29. This spacing insures that, in the completed joint, the recess will be spaced far enough from the shear plane to avoid any reduction of the shear strength of the joint.

It can be seen in FIG. 3 that the recess 41 initially has no effect on the deformation of the expanding head during the pin-setting process. As the unweakened leading portion of the head enters the sleeve 13, the only deformation of the head that occurs is the slight amount resulting from the resistance exerted by the sleeve to entry of the head.

In this respect, it is to be noted that the blind-side end of the sleeve is to be ductile enough to be expanded and bulged into the blind-side head 23, without splitting in the process, and that the pin typically is composed of metal of a substantially greater hardness and lower ductility than the sleeve. For example, the sleeve may be 2017 (T-4) aluminum, and the pin may be 7075 (T-6) aluminum, achieved by heat treating the pin to a substantially uniform hardness through out after the heading operation in which the expanding head 19 is formed. The expanding shoulder 29 preferably is hardened subsequent to such heat treating by rolling and cold-working, which raise its hardness substantially above that of the remainder of the expanding head.

As the larger portion of the taper 31 enters the sleeve 13, as shown in FIG. 4, the taper begins to yield inwardly as the annular wall 43 around the inner end portion of the recess begins to collapse inwardly, as indicated at 44. Accordingly, this yielding, combined with a limited amount of wire-drawing deformation of the metal around the periphery of the head, produces the deformation necessary for proper formation of the head 23 on the blind-side end of the sleeve 13.

It will be evident that the thickness of the wall 43 determines its strength, and that this strength may be varied by enlarging the recess. Moreover, by increasing its depth, the wall 43 will be weakened, and the point along the taper where deformation begins will be moved closer to the expanding shoulder. In general, the spacing of the inner end 42 from this shoulder should be about the same as the spacing of the internal stop shoulder 37 from the blind side of the work when the plates are of minimum thickness or grip length, so that the inner end will be about even with, or slightly outside, the blind side with such workpieces, and will be drawn into the work in maximum grip.

As the setting operation is completed, as shown in FIG. 5, the blind-side sleeve head 23 is bulged further into tight bearing contact with the blind side of the work. Then, when the expanding shoulder 29 reaches the opposed stop shoulder 37 in the sleeve 13, the markedly increased resistance to further movement of the expanding head first results in forcing of the locking crown 24 to the left and into the locking groove 25, and then in the snapping off of the pulling section 18 at the breakneck groove 28. This sets the rivet securely in the workpieces with the latter clinched tightly together.

The condition shown in FIG. 5 is illustrative of the condition in maximum grip, that is, with workpieces having a combined thickness near the higher end of the range for which the rivet 10 is designed. In maximum grip, the degree to which the expanding head 19 is drawn into the work is the greatest, and the capability of the head to deform during the setting operation is the most important. In minimum grip (not shown), on the other hand, the inner end 42 of the weakening recess 41 need not enter the work, but instead will stop outside the blind side thereof. Thus, the capability of the head to deform during the setting operation in minimum grip is less important, although a minor amount of collapsing of the head into the weakening recess may occur.

Shown in FIG. 6 is a modified form of the expanding head, indicated generally by the reference number 45, for increasing the bearing area that is obtained between the blind-side plate and the blind-side head formed on the sleeve. Instead of the illustrative six-degree taper 31 of the first form shown in FIGS. 1 through 3, this head has a smaller, end portion 47 tapered with a steeper slope (for example, nine degrees), and a larger end portion 48 tapered with a lesser slope (on the order of three degrees, for example).

With this head configuration, the bulging of the sleeve that will be accomplished before the weakening recess 41 becomes effective is greater, due to the greater initial resistance to drawing of the taper 41 into the sleeve. It will be seen in FIG. 6 that the inner end 42 of the weakening recess is close to the juncture of the two tapers, so that the recess will become effective as the larger end portion of the steeper taper 47 approaches the blind side of the work.

Two additional modifications are shown in FIGS. 7 and 8, to illustrate possible variations in the configuration of the weakening recess. In FIG. 7, the head 49 has a recess 50 that is generally conical in shape, with a rounded inner end 51. Since it is the cross-sectional thickness of the annular wall 52 around the inner end of the recess that determines the deformability of the taper 53, the shape of the outer portion of the recess is of little significance in this respect.

If a less yieldable free end portion of the head is desired, the configuration of FIG. 8 may be used. This head 54 has a recess 55 with an inner end 58 that is similar to the inner end 51 of the recess 50 in FIG. 7, and in addition, has an inturned annular flange 58 around the outer end of the recess for reinforcing the free end portion of the head. This flange will not affect the ability of the taper 59 to collapse during formation of the blind-side head on the sleeve, but reduces the deformability of the free end portion, around the reinforcing flange.

From the foregoing, it will be apparent that the present invention provides a blind rivet 10 which permits the use of a setting pin 17 having the optimum hardness for a given material, for optimum strength in the completed joint, and also having optimum deformability in the expanding head 19 for proper formation of the blind-side head 23 on the sleeve 13. Moreover, these important advantages are achieved without need for peripheral annealing, and thus may be achieved in rivets in which peripheral annealing is impractical or economically undesirable.

Although the present invention is particularly well suited for use with aluminum rivets, it should be evident that it is not so limited. It also should be evident that, while several specific embodiments have been illustrated and described, various modifications and changes may be made without departing from the spirit and scope of the invention.

I claim:

1. In a blind rivet for joining two side-by-side workpieces having aligned holes for receiving said rivet and having a combined thickness within a predetermined range of thicknesses, the combination of:

a tubular sleeve longer than the combined thickness of the workpiece to be riveted and having a first head on one end for engaging one side of the workpieces;

stop means on said sleeve adjacent said first head; and a setting pin extending through said sleeve for use in expanding the other end of the sleeve to form a second head thereon for abutting against the other side of the workpieces and clamping the latter together between said heads, said setting pin having:

a central section disposed within said sleeve;

a pulling section on one end of said central section adjacent said first head to be gripped preparatory to pulling of said setting pin relative to said sleeve;

an expanding head on the other end of said central section projecting beyond said other end of said sleeve and having a taper progressively increasing the diameter of said head beyond said other end, to be drawn into said sleeve during such pulling of said setting pin to form said second head thereon, said taper being composed of material of substantially uniform hardness and ductility, and said expanding head also having an expansion section thereon, including a shoulder forming the end of said head facing toward said sleeve, for initiating expansion of the sleeve as the head is drawn into the sleeve;

said stop means being engageable with said shoulder as the latter is drawn through said sleeve to a preselected position within the sleeve, to resist further movement of said expanding head into said sleeve when said shoulder is adjacent said first head and adjacent said one side of the workpieces;

means for causing said pin to break off adjacent said first head with said taper inside said sleeve after said stop means abuts against said shoulder;

and recess means extending into said expanding head from the free end thereof toward said central section and weakening the larger end portion of said taper sufficiently to allow it to collapse partially inwardly upon being drawn into the adjacent workpiece, said recess means being positioned in said head a preselected distance from said shoulder to terminate short of the shear plane between the workpieces when the shoulder is in engagement with said stop means, thereby to avoid weakening of said pin in said shear plane, the distance between said shoulder and said recess means being selected to cause said recess means to be drawn into the blind side of the workpieces when the combined thickness thereof is in the higher portion of said range of thicknesses, and thereby to allow said taper to collapse partially inwardly as it enters the workpieces.

2. The combination defined in claim 1 in which said recess means is positioned in said head to remain outside the workpieces when the combined thickness is in the lower portion of said range, and to be drawn into the work, short of said shear plane, only when the combined thickness is in the higher portion of said range.

3. The combination defined in claim 1 in which said recess means is positioned to form an annular wall between said taper and the inner end of said recess means, of preselected approximate strength determined by the hardness of the material of said taper and the thickness of said annular wall.

4. The combination defined in claim 1 in which said sleeve and said pin are composed of aluminum, and said head is of substantially uniform hardness from said expansion section to said free end.

5. The combination defined in claim 4 in which said recess means is a cylindrical recess extending coaxially into said head from said free end and having an inner end between the ends of said taper.

6. The combination defined in claim 1 in which said taper is formed in two portions of different slopes, the smaller portion of the taper having the steeper slope.

7. The combination defined in claim 6 in which said smaller portion has a slope on the order of nine degrees, and said larger portion has a slope on the order of three degress.

8. In a blind rivet for joining two side-by-side workpieces having aligned holes for receiving said rivet, and having a combined thickness within a predetermined range of thicknesses, the combination of:

a tubular sleeve longer than said combined thickness and having a first head on one end for engaging one side of the workpieces; and a setting pin extending through said sleeve for use in expanding the other end of the sleeve to form a second head thereon for abutting against the other side of the workpieces and clamping the latter together between said heads, thereby forming a riveted joint with a shear plane between the workpieces, said setting pin having:

a central section disposed in said sleeve, a pulling section on one end of said central section projecting outwardly beyond said first head;

an expanding head on the other end of said central section projecting outwardly beyond said other end of said sleeve, said expanding head having an expanding section adjacent said other end of said sleeve including a shoulder facing toward the sleeve to initiate expansion thereof as said expanding head is pulled into the sleeve, and a taper beyond said shoulder increasing in diameter from adjacent said shoulder toward the free end of said expanding head, to be drawn into said sleeve during pulling to expand the sleeve and form a bulb-shaped head thereon, said taper being composed of material of substantially uniform hardness and ductility;

stop means in said sleeve adjacent said first head and on the same side of the shear plane as the first head, for abutting against said shoulder as the latter is drawn through said sleeve and preventing further movement of said expanding head into the sleeve thereby to position the expanding head permanently in said rivet with said taper drawn into the sleeve a distance that is determined by the actual combined thickness of the workpieces within said range of thicknesses and with the expanding head extending across the shear plane;

means for causing the setting pin to break off adjacent said first head after said shoulder has engaged said stop means;

and recess means in said expanding head for structurally weakening said taper a preselected distance from said shoulder toward the free end of said expanding head, in the area of the taper that is drawn into the workpieces when the combined thickness thereof is in the higher portion of said range of thicknesses, said recess means being spaced from said shoulder far enough to remain on the opposite side of said shear plane from the shoulder in the completed riveted joint.

9. The combination defined in claim 8 in which said recess means is positioned in said head to remain outside the workpieces when the combined thickness is in the lower portion of said range, and to be drawn into the work, short of said shear plane, only when the combined thickness is in the higher portion of said range.

10. The combination defined in claim 8 in which said taper is formed in two portions of different slopes, the smaller portion of the taper having the steeper slope.

* * * * *